United States Patent [19]

Schweer

[11] Patent Number: 4,689,526

[45] Date of Patent: Aug. 25, 1987

[54] METHOD AND CIRCUIT FOR THE DIGITAL DEFLECTION CORRECTION OF TV PICTURE TUBES

[75] Inventor: Rainer Schweer, Waldkirch, Fed. Rep. of Germany

[73] Assignee: Deutsche ITT Industries GmbH, Freiburg, Fed. Rep. of Germany

[21] Appl. No.: 736,939

[22] Filed: May 22, 1985

[30] Foreign Application Priority Data

May 23, 1984 [EP] European Pat. Off. ........ 84105866.2

[51] Int. Cl.[4] .............................................. H01J 29/56
[52] U.S. Cl. .................................................... 315/371
[58] Field of Search ................................. 315/371, 368

[56] References Cited

U.S. PATENT DOCUMENTS

| | | | |
|---|---|---|---|
| 3,893,174 | 7/1975 | Sano et al. ............................. | 358/65 |
| 4,282,546 | 8/1981 | Reitmeier ............................. | 358/160 |
| 4,354,143 | 10/1982 | Judd ...................................... | 315/368 |
| 4,401,922 | 8/1983 | Kamata et al. ....................... | 315/368 |
| 4,549,117 | 10/1985 | Takahashi et al. ................... | 315/371 |
| 4,600,945 | 7/1986 | Bolger ................................... | 358/160 |

Primary Examiner—Theodore M. Blum
Attorney, Agent, or Firm—T. L. Peterson

[57] ABSTRACT

To achieve improved and, in particular, optimum deflection correction of television picture tubes the sawtooth signal from the horizontal or vertical oscillator which is conventionally subjected to a correction, is left uncorrected. Per line, the time relation of the digital video signal controlling the picture tube via digital-to-analog converters is changed with respect to the time relation of the video signals as reconditioned with the aid of a video processor, i.e., by the correcting value depending on the respective locus of an image spot on the screen. Accordingly, the deflection correction is not carried out by influencing deflection means, but by a corresponding correction of the time relation of the video signals with respect to their loci on the picture screen.

9 Claims, 7 Drawing Figures $mow = mwa + moa$

METHOD AND CIRCUIT FOR THE DIGITAL DEFLECTION CORRECTION OF TV PICTURE TUBES

BACKGROUND OF THE INVENTION

The invention pertains to a method and circuit for the digital deflection correction of television picture tubes.

Television receivers, more particularly color television receivers employing digital processing of the composite color signal have been described, for example, in the technical journal "Electronics" of Aug. 11, 1981, on pages 97 to 103. On page 101 there is described the geometry correction in use since the early stages of television engineering. This correction is required in conventional types of television picture tubes because the viewing screen is not a spherical surface. As with conventional television receivers, geometry correction is also achieved in television receivers employing digital signal processing, in that both the horizontal and the vertical deflection signals are corrected correspondingly. This correction is known as parabolic correction to those skilled in the art.

This kind of geometry correction can only be realized up to a certain extent at a reasonable cost. Accordingly a visible amount of error results. Moreover, the usual geometry correction cannot be carried out merely by electrically influencing the electric deflection signal but, in addition thereto, requires influencing the magnetic field produced by the deflection coils.

SUMMARY OF THE INVENTION

It is one object of the invention to provide a novel correction method deviating from the former basic principle of the geometry correction, as well as circuits suitable for carrying out the method so that it is possible, on the one hand, to achieve better correction including correction at the edges of the viewing screen and, on the other hand, to be able to do without additional magnetic correction measures.

Accordingly, it is one advantage of the invention that the geometry correction is effected with the aid of purely electronic means and that these electronic means can be easily realized in the form of integrated circuits.

To achieve improved and, in particular, optimum deflection correction of television picture tubes the sawtooth signal from the horizontal or vertical oscillator which is conventionally subjected to a correction, is left uncorrected. Per line, the time relation of the digital video signal controlling the picture tube via digital-to-analog converters is changed with respect to the time relation of the video signals as reconditioned with the aid of a video processor, i.e., by the correcting value depending on the respective locus of an image spot on the screen. Accordingly, the deflection correction is not carried out by influencing deflection means, but by a correspondingly correction of the time relation of the video signals with respect to their loci on the picture screen.

BRIEF DESCRIPTION OF THE DRAWING

The invention will be better understood from a reading of the following detailed description in conjunction with the drawing in which.

DETAILED DESCRIPTION

The basic idea underlying the invention will now be explained with reference to the schematic block diagram of FIG. 1. Sawtooth signals produced by the horizontal or the vertical oscillator ho, vo and which, as a rule, have a linear voltage-time characteristic, remain uncorrected. Per line, the temporal position of the digital video signals dv is changed by a correction value depending on the respective locus of image spot on the screen of the picture tube fr. Accordingly, in distinction to the hitherto conventional methods, the geometry correction is not effected by correcting the deflecting signals, but by influencing the temporal position of the digital video signals. According to one preferred embodiment of the method of the invention, this is accomplished in that the horizontal sync pulse hs is delayed at least by the period of time corresponding to the maximum east-west deviation mow, and is only thereafter fed as a delayed horizontal sync pulse hs' to the horizontal oscillator ho. Moreover, in this embodiment, the reconditioned video signals dv are read into the memory my at the frequency of the clock signal ft and are read out from this memory synchronously at the same frequency. The thus obtained video signals are corrected in their amplitudes by way of interpolation with the aid of the interpolator ip.

According to a second preferred embodiment, the reconditioned video signals dv are read into the memory my which is addressable via read-in and read-out addresses, at the frequency of the clock signal ft, and read out from this memory in such a way that the read-out addresses are activated at a frequency increased in accordance with the correction value. The corrected video signal dv' is then fed to the digital-to-analog converters da.

Figure 1:
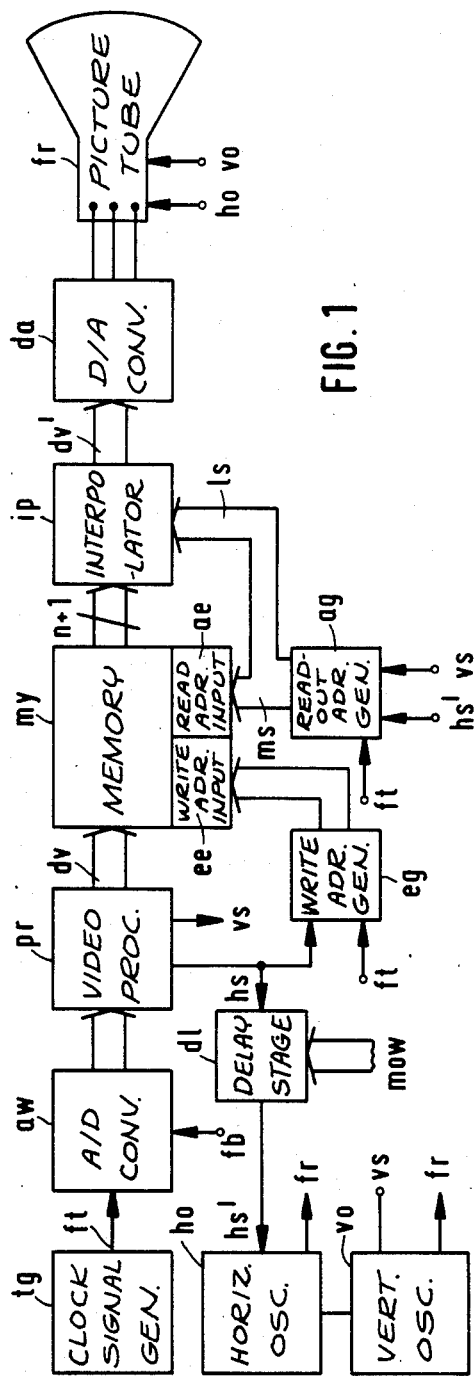
FIG. 1 is a first circuit according to the invention.
Figure 2:
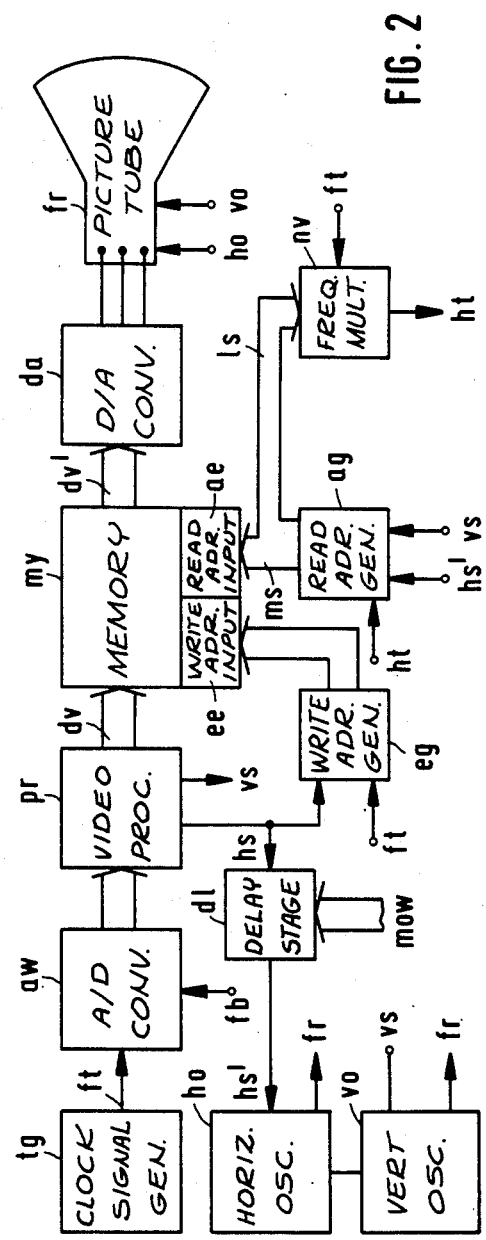
FIG. 2 is a second circuit according to the invention.

The aforementioned first embodiment is based on the circuit as shown in FIG. 1, and the second embodiment is based on the circuit as shown in FIG. 2. In both drawings identical partial circuits are indicated by the same reference numerals so that the following description analogously applies to both drawings, insofar as identical parts are concerned.

The composite color signal fb as applied to the analog-to-digital converter aw in analog form, is converted by the latter in the rhythm of the clock signal ft as produced by the clock signal generator tg, into parallel digital words. The parallel digital words are then further processed by the further circuit parts in the rhythm of the clock signal ft. The frequency of the clock signal ft is an integer multiple of the color subcarrier frequency, preferably the quadruple thereof.

The output signals of the analog-to-digital converter aw are fed to video processor pr which separates the horizontal or vertical sync pulses hs, vs from the composite color signal. The horizontal sync pulses hs are delayed by delay stage dl which has a delay time equal to the maximum east-west deviation mow (of FIG. 3). The delayed horizontal sync pulses hs' are fed to the horizontal oscillator ho. The horizontal oscillator ho, in turn, controls the deflection means of the picture tube fr.

The vertical sync pulses vs are fed to the vertical oscillator vo whose rated frequency may be derived from the rated frequency of the horizontal oscillator ho, (cf. the connection between the two oscillators) with the output thereof controlling the vertical deflection means of the picture tube fr.

The reconditioned video signals dv are fed to memory my which is addressable via the write and read addresses. The write address input ee is connected to the output of write address generator eg. Address generator eg is clocked by the clock signal ft. Horizontal sync pulse hs serves as a reset pulse. The read address inputs ae are connected to the output of the read-out address generator ag which is clocked synchronously by the clock signal ft. Delayed horizontal sync pulse hs' serves as a reset pulse. The write address generator eg can be realized as a binary counter which counts the pulses of the clock signal ft.

Interpolator ip which is of the nth grade (n being an integer greater than zero), has inputs connected to the outputs of the memory my via n+1 parallel buses on which, in response to an address, the associated storage value and the storage values associated with the n following addresses, are read and simultaneously provided to the interpolator ip. In the two simplest cases, interpolator ip is a linear or a square interpolator, and since n=1 or n=2, there are provided two or three buses respectively. From the read address generator ag, interpolator ip receives as an interpolation performance characteristic address bits ls which are lower order than the address bits ms.

The digital video signals dv' appear at the output of the interpolator ip and after conversion into analog signals by digital-to-analog converter da serve to control the picture tube fr.

In embodiment of FIG. 2, the interpolator ip of FIG. 1 has been omitted, and the memory my is connected to the digital-to-analog converters da via a single bus. The read address generator ag, with the digits ls of its output signal lying on the low-order side and exceeding the number of address digits ms, controls (selects) the non-integer frequency multiplier nv which, from the clock signal ft, produces the correspondingly higher frequency auxiliary clock signal ht, with the non-integer factor m thereof being in proportion to the digits ls; in the most simple case it may be equal to these digits.

Figure 3:
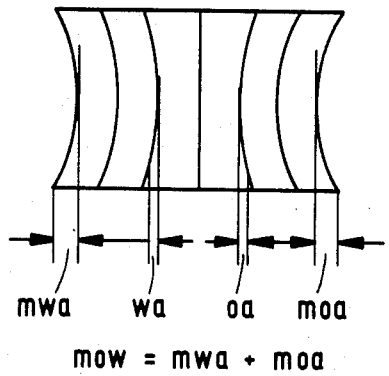
FIG. 3 schematically shows the course of the horizontal geometry deviations of a picture tube.

FIG. 3 schematically denotes how the horizontal geometry distortions on the screen of the picture tube fr can be ascertained by computation. The horizontal distortion on the lefthand half of the screen is referred to therein as the west distortion wa, and the corresponding distortion on the righthand half of the screen is referred to as the east distortion oa, with both distortions having different values with respect to one image spot on the screen. The maximum east-west distortion mow is defined as the sum of both the maximum west distortion mwa and the maximum east distortion moa, with the latter applying to the lefthand top- or bottom-most or righthand top- or bottom-most corner of the screen of the picture tube.

Figure 4:
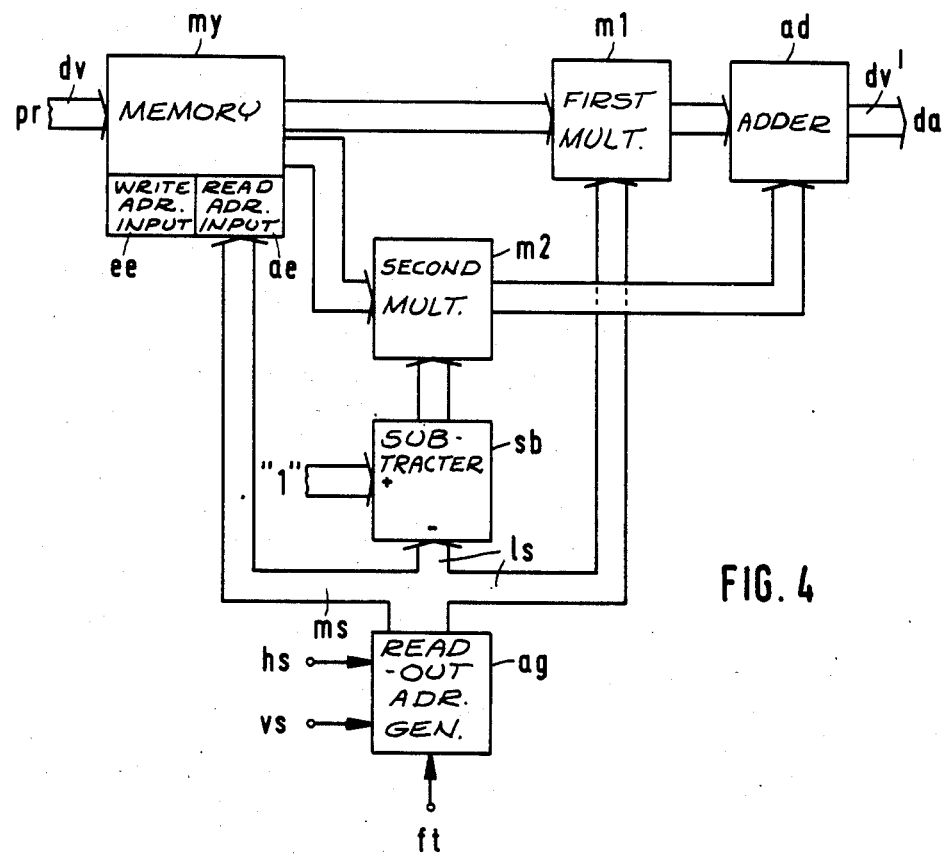
FIG. 4 is a block diagram of the interpolator employed with the arrangement of FIG. 1.

FIG. 4 shows a preferred embodiment relating to a first-order interpolator, hence a linear one, for use in connection with FIG. 1 (n=1, n+1=2). FIG. 4 only shows the circuits my, ag of FIG. 1 associated with the interpolator. The output of the memory my for the first storage (memory) value is connected via the first bus, to the input of the first multiplier m1. The second input of multiplier m1 re-ceives the low-order digits ls of the output signal from the read-out address generator ag. The output of multiplier m1 is connected to the first input of the adder ad. At the output of adder ad appear the digital video signals dv' for controlling the digital-to-analog converters da. The first input of the second multiplier m2 is connected via the second bus to the output of the memory my for the second storage (memory) value. The second input of multiplier m2 is connected to the output of the subtracter sb. The minuend input of subtracter sb is fed the number one "1". The subtrahend input of subtracter sb receives the lower-order digits ls of the output signal from the read address generator ag. The output of the second multiplier m2 is connected to the second input of the adder ad.

The video signals dv' appearing in synchronism with the video signals dv as read into the memory my, are accordingly interpolated in such a way that their amplitudes at the point of impingement of the electron beam upon the screen produce the desired "correct" picture impression even though the screen deviates from a spherical surface.

Figure 5:
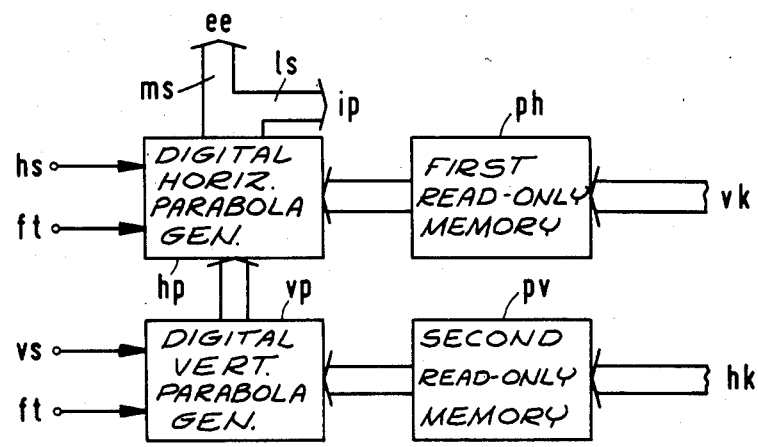
FIG. 5 is a block diagram of an address generator.

The read address generator of FIGS. 1 and 2 is shown in greater detail in FIG. 5. Digital horizontal parabola or digital vertical parabola generators hp, vp, produce the output signals consisting of most significant part ms and lease significant part ls. The generators hp and vp are clocked by the clock signal ft, and which has to be reset by the horizontal sync or vertical sync pulses hs, vs, respectively.

Corresponding first and second read-only memory ph, pv are programmable by the television set manufacturer. These read-only memories contain the three coefficients a, b, c of the horizontal center-of-screen parabola and the vertical-direction-dependent correcting values vk, or else the three coefficients e, f, g which are determinative of the vertical center-of-screen parabola, and also he horizontal-direction-dependent correcting values hk thereof.

Figure 6:
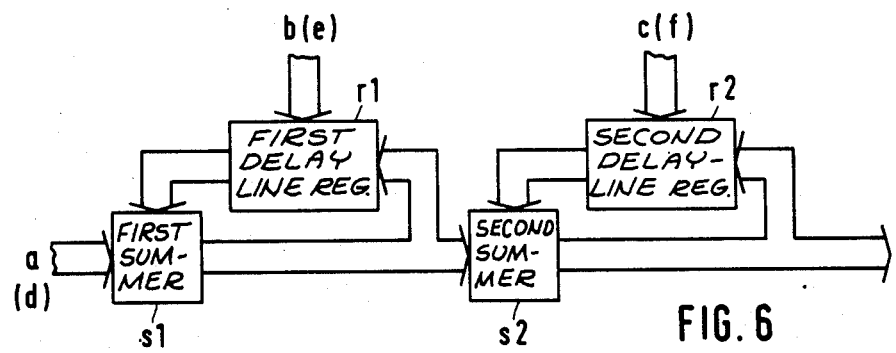
FIG. 6 is a circuit diagram of a parabola generator.

To produce the aforementioned center-of-screen parabolas it is possible; as shown in FIG. 6, to use a circuit which contains a first and a second summer s1, s2 as well as a first and a second delay-line register r1, r2, respectively. To the first summer s1 is fed coefficient a or d, and via a first delay-line register r1, the output signal thereof, with the coefficient b or e being loaded into register r1.

The second summer s2 receives the output signal of the first sum-mer s1 and one input signal receives its own output signal as a second input signal via the second delay line register r2, with the coefficient c or f being loaded into the register r2. The delay time of the delay-line registers r1, r2 is equal to the period length of the clock signal ft. The correcting values hk, vk are stored in the read-only memories ph, pv as additive and/or multiplicative corrections of the coefficients a, b, c or e, f, g respectively.

Figure 7:
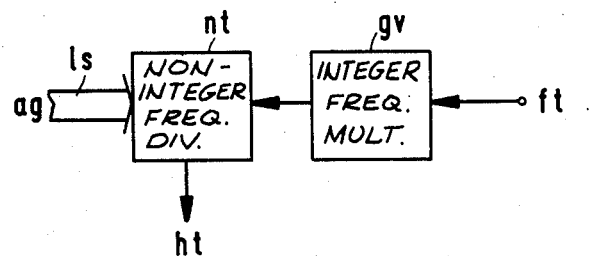
FIG. 7 is a circuit diagram of the non-integral frequency multiplier used with the arrangement of FIG. 2.

FIG. 7 illustrates a non-integer frequency multiplier nv employing the non-integer factor m. It includes integer frequency multiplier gv with the integer factor g, and the subsequently arranged non-integer frequency divider nt with the non-integer divisional number p, to which there are fed the least significant digits ls of the read-out address generator ag, and at the output of which there appears the auxilliary clock signal ht. Accordingly, with respect to the aforementioned numbers m, g, p there applies the following relationship: m=g/p. As a non-integer frequency divider there may be used, for example, an arrangement as disclosed in the published European Patent Application EP 80 970.

The invention, it is particularly suitable for being realized advantageously in the form of semiconductor integrated circuits. Because it operates exclusively with digital circuit principles, the semiconductor circuit families which are customarily used in the fields of digital signal processing may be used with MOS integrated circuits being particularly suitable. Moreover, the invention is particularly suitable for use in connection with the digital circuits developed in accordance with the aforementioned prior art reference for the digital signal processing in television receivers. In such a case, the usual deflection processor may be of a very simple design. In principle it merely needs to be a simple triggered sawtooth oscillator.

What is claimed is:

1. A method for providing east-west deflection distortion correction of a television picture tube which is controlled by digital video signals via digital to analog converters, said method including the steps of:
   generating horizontal and vertical sawtooth deflection signals;
   delaying said horizontal deflection signals by a time delay at least equal to the maximum east-west deflection distortion;
   coupling said deflection signals to the deflection means of said picture tube;
   correcting first digital video signals by correcting values depending on the loci of respective image spots on the screen of said picture tube to produce said digital video signals.

2. A method in accordance with claim 1, comprising the steps of:
   generating said horizontal deflection signals by with a triggerable horizontal oscillator
   providing trigger signals to said horizontal oscillator by delaying a horizontal synchronizing pulse by at least the period of time corresponding to a maximum east-west distortion of said picture tube
   storing said first digital video signals in a memory at a first frequency;
   reading said first digital video signals from said memory at said first frequency
   correcting by interpolation said first digital video signals read from said memory to provide said digital signals.

3. A method in accordance with claim 1 comprising the steps of: storing said first digital video signals in a memory at a first frequency reading said first digital video signals from said memory at a second frequency which is higher than said first frequency in accordance with a correction value to produce said digital video signals.

4. A circuit for digital deflection correction of television picture tubes which are controlled via digital-to-analog converters by digital video signals derived from composite color signals and in which a horizontal and vertical oscillators are triggered by a horizontal and vertical sync pulses to produce sawtooth deflection signals for horizontal and vertical deflection purposes, respectively, said circuit comprising:
   a delay stage receiving said horizontal sync pulse and delaying application of said horizontal sync pulse to said horizontal oscillator by a time delay at least equal to the maximum east-west deflection distortion;
   a memory, addressable via write and read addresses for storing said digital signals;
   a write address generator coupled to said memory, said write address generator being clocked by first clock signals at a first predetermined rate;
   a read address generator coupled to said memory, said read address generator being clocked by second clock signals at a second predetermined rate, said second predetermined rate being higher than said first predetermined rate; and
   said read address generator comprising:
   a digital horizontal parabola generator resettable by said horizontal sync pulse, a first read only memory containing three first coefficients determinative of the horizontal center-of-screen parabola and their vertical direction dependent first correction values,
   a digital vertical parabola generator resettable by said vertical sync pulse, a second read only memory containing three second coefficients determinative of the vertical center of screen parabola and their horizontal direction dependent second correction values.

5. A circuit in accordance with claim 4 comprising:
   a non-integer frequency multiplier for producing said second clock signals from said first clock signals, the non-integer factor of said multiplier being in proportion to the digits of said read address generator exceeding the number of address digits on the low order side.

6. A circuit in accordance with claim 5 wherein said multiplier comprises:
   an integer frequency multiplier and a subsequently arranged frequency divider.

7. A circuit in accordance with claim 4 wherein:
   at least one of said vertical or horizontal parabola generators comprises:
   a first summer having one input receiving a respective one of said first or second coefficients, and having a second input coupled to its output via a first delay line register preloaded with a second one of said first or second coefficients;
   a second summer having one input coupled to said first summer output, a second input coupled to its output via a second delay line register preloaded with a third one of said first or second coefficients; and
   the delay time of said first and second delay line registers each being equal to the period of said first clock signals.

8. A circuit for digital deflection correction of television picture tubes which are controlled via digital-to-analog converters by digital video signals derived from composite color signals and digitally reconditioned by a video processor, and in which horizontal and vertical oscillators are triggered by horizontal and vertical synch pulses to produce sawtooth deflection purposes, respectively, said circuit comprising:
   a delay stage receiving said horizontal synch pulse and delaying application of said horizontal synch pulse to said horizontal oscillator by a time delay at least equal to the maximum east-west deflection distortion;
   a memory having data inputs receiving said reconditioned signals and addressable via write and read addresses for storing said reconditioned signals;

a write address generator coupled to said memory, said write address generator being clocked at a first predetermined rate and reset by said horizontal synch pulse;

a read address generator coupled to said memory, said read address generator being clocked at said first predetermined rate synchronously with said write address generator and reset by the output of said delay stage;

said read address generator comprising: a digital horizontal parabola generator resettable by said horizontal synch pulse, a digital vertical parabola generator resettable by said vertical synch pulse, a first read only memory for first coefficients determinative of the horizontal center-of-screen parabola and for vertical direction dependent first correction values, a second read only memory for second coefficients determinative of the vertical center-of-screen parabola and for horizontal direction dependent second correction values;

an $n^{th}$ grade interpolator coupled to the output of said memory, where n is a non zero integer, and the interpolator performance characteristic thereof is determined from the read address generator digits which exceed an address positional number on the low order side, the output of said interpolator providing digital signals to said digital-to-analog converters;

said memory in response to a read address providing an associated stored value and stored values associated with n following addresses simultaneously to said interpolator over n+1 parallel buses.

9. A circuit in accordance with claim 8 wherein:

said interpolation is of the first order, n=1, and comprises:

a first multiplier having a first input coupled to the output of said memory for a first storage value via a first one of said buses, and a second input receiving the low order digits of said read address generator output; a second multiplier having a first input coupled to the ouput of said memory for the second storage value via a second one of said buses;

an adder having first input coupled to said first multiplier output, a second input coupled to said second multiplier output; and a subtracter having a minuend input receiving a digital representation of the number one, a subtrahend input receiving said low order digits of said read address generator output, an output connected to the second input of said second multiplier.

* * * * *